United States Patent [19]

Rashford

[11] Patent Number: 5,399,980
[45] Date of Patent: Mar. 21, 1995

[54] CAPACITIVE MEASURING CIRCUIT

[75] Inventor: Paul W. Rashford, Redmond, Wash.

[73] Assignee: AlliedSignal Inc., Morris Township, Morris County, N.J.

[21] Appl. No.: 151,417

[22] Filed: Nov. 12, 1993

[51] Int. Cl.[6] .......................................... G01R 27/26
[52] U.S. Cl. .................................... 324/678; 324/680; 73/517 B
[58] Field of Search ............... 324/661, 676, 678, 679, 324/680, 725, 130; 73/517 B, 517 AV; 330/9; 340/870.37

[56] References Cited

U.S. PATENT DOCUMENTS

| | | | |
|---|---|---|---|
| 4,054,833 | 10/1977 | Briefer | 324/679 |
| 4,102,202 | 7/1978 | Ferriss | 73/517 B |
| 4,336,718 | 6/1982 | Washburn | 73/517 B |
| 4,345,474 | 8/1982 | Deval | 73/517 B |
| 4,634,965 | 1/1987 | Foote | 324/678 |

*Primary Examiner*—Vinh Nguyen
*Assistant Examiner*—Diep Do
*Attorney, Agent, or Firm*—Howard G. Massung

[57] ABSTRACT

A circuit for relatively accurately measuring the capacitance of a pair of capacitive elements which may be part of an accelerometer. The circuit includes a drive circuit, a switching circuit, a pair of bridge capacitors and a detector circuit. The bridge capacitors and the capacitive elements are connected together to form a bridge. Common nodes between the capacitive elements and the bridge capacitors are interconnected together by the switching circuit in a first mode of operation to force a reference or null condition to enable the common nodes to discharge to a predetermined reference voltage. The common nodes are isolated from one another in a second mode of operation during which time the bridge is charged to a predetermined voltage by the drive circuit to enable the detector circuit connected to the common nodes to detect differences in voltage between each of the two common nodes. In order to reduce errors resulting from unequal leakage currents and junction capacitances, the switching circuit is configured as a single JFET which additionally reduces the parts count and ultimately the cost of the accelerometer.

10 Claims, 2 Drawing Sheets

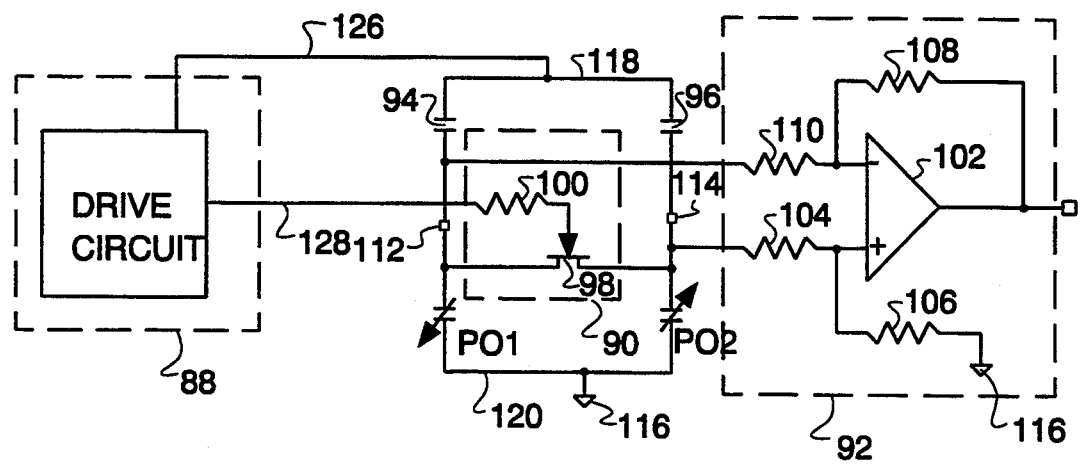
*Fig. 4*
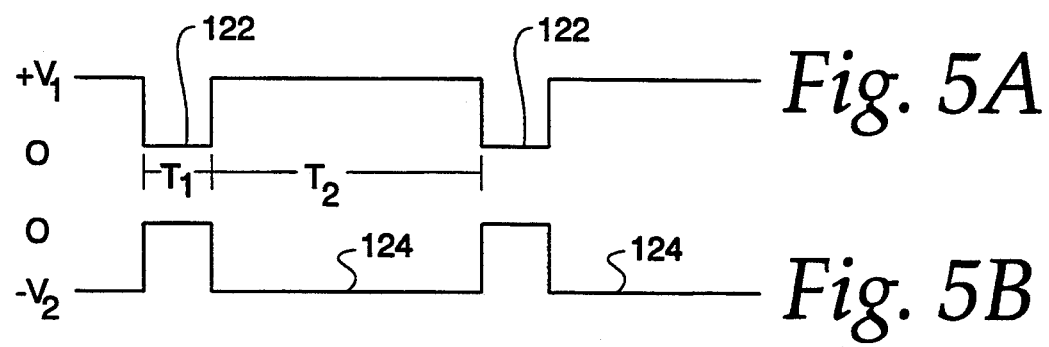
*Fig. 5A*
*Fig. 5B*

CAPACITIVE MEASURING CIRCUIT

BACKGROUND OF THE INVENTION

1. Field of the Invention

The present invention relates to an improved circuit for measuring capacitance and, more particularly, to a circuit for accurately measuring relatively small changes in the capacitances of a pair of variable capacitive elements, which includes a detector and other circuitry for measuring the difference of an electrical characteristic of the capacitive elements, while minimizing errors in the output signal due to null shifts and biasing errors of the detector.

2. Description of the Prior Art

Capacitive measuring circuits are generally known in the art. An example of such a circuit is disclosed in U.S. Pat. No. 4,634,965. Such circuits are known to be used in various applications, including certain known types of accelerometers to provide a signal representative of acceleration. In particular, certain known accelerometers are configured with a proof mass suspended by a flexure which deflects in response to accelerations along a sensitive axis, generally perpendicular to the plane of the flexure hinge axis and perpendicular to the plane of the proof mass. At rest, the proof mass is suspended equidistantly between upper and lower excitation rings. Electrically conductive material, known as pick-off capacitance plates, are disposed on opposing sides of the proof mass to form capacitive elements with the excitation rings. More particularly, a pick-off capacitance plate disposed on the upper side of the proof mass forms a first capacitive element with the upper excitation ring. Similarly, the pick-off capacitance plate disposed on the lower side of the proof mass forms a second capacitive element.

As mentioned above, the proof mass and thus the pick-off capacitance plates are normally equally spaced from the upper and lower excitation rings in an at-rest or null position. An acceleration force along the sensitive axis causes the proof mass to deflect either upwardly or downwardly. Such upward or downward deflection of the proof mass causes a change in the distance between the pick-off capacitive plates and the upper and lower excitation rings. This change in the distance between the pick-off capacitance plates and the upper and lower excitation rings causes a change in the capacitance of the first and second capacitive elements. For example, if the accelerometer is subjected to an upward acceleration, the proof mass will deflect downwardly forcing the distance between the upper excitation ring and the pick-off capacitance plate on the upper side of the proof mass to increase, while the distance between the lower excitation ring and the pick-off capacitive plate on the lower side of the proof mass decreases. Since the capacitance of a capacitive element is a function of the distance between the plates, an upward acceleration would cause a decrease of the capacitance of the first capacitive element and an increase in the capacitance of the second capacitive element. Conversely, accelerations directed downwardly along the sensitive axis will cause the proof mass to deflect upwardly, thus increasing the capacitance of the first capacitive element and decreasing the capacitance of the second capacitive element.

Consequently, the difference in the values of capacitance of the first and second capacitive elements is thus representative of the displacement of the proof mass in response to either an upward or downward acceleration along the sensitive axis. The displacement signal is applied to a servo system that drives electromagnets to return the proof mass to its null position. The magnitude of the drive current to the electromagnets is thus a measure of the acceleration along the sensitive axis.

Since the magnitude of the drive current to the electromagnets is dependent upon the capacitance values of the first and second capacitive elements, it is critical to the accuracy of the system that the capacitance of the capacitive elements be measured as accurately as possible. Unfortunately, known circuits for measuring the capacitance of the capacitive elements, such as disclosed in U.S. Pat. No. 4,634,965, include error sources that contribute to errors in the accelerometer output signal. In particular, the circuit disclosed in the '965 patent includes a pair of junction field effect transistors (JFETs). Such JFETs are known to have different leakage currents and different junction capacitances that can result in errors in the measurement of the capacitance of the first and second capacitive elements which, in turn, result in errors in the output of the accelerometer.

There are other problems with known circuits that can affect the accuracy of an accelerometer. For example, in some known accelerometers, one of the pick-off capacitive plates potentially is able to make physical contact with one of the excitation rings under certain conditions due to the physical configuration of the accelerometer. Such a condition causes a short circuit of one of the capacitive elements that can cause additional errors in the accelerometer for a time period dependent upon the recovery time of the system.

SUMMARY

It is an object of the present invention to solve various problems of the prior art.

It is yet another object of the present invention to provide an accelerometer which provides a relatively more accurate output signal than known accelerometers.

Briefly, the present invention relates to a circuit for accurately measuring the capacitance of a pair of capacitive elements which may be part of an accelerometer. The measuring circuit includes a drive circuit, a switching circuit, a pair of bridge capacitors and a detector circuit. The bridge capacitors and the capacitive elements are connected together to form a bridge. Common nodes between the capacitive elements and the bridge capacitors are interconnected together by the switching circuit in a first mode of operation to force a reference or null condition to enable the common nodes to discharge to a predetermined reference voltage. The common nodes are isolated from one another in a second mode of operation during which time the bridge is charged to a predetermined voltage by the drive circuit to enable the detector circuit connected to the common nodes to detect differences in voltage between each of the two common nodes. In order to reduce errors resulting from unequal leakage currents and junction capacitances, the switching circuit is configured as a single JFET which additionally reduces the parts count and ultimately the cost of the accelerometer. In addition, the capacitive elements are referenced to the pick-off drive voltage during the first mode of operation when one of the capacitive elements becomes shorted, which maintains a relatively high detector gain, thereby enabling a relatively quick recovery from such a condition.

BRIEF DESCRIPTION OF THE DRAWING

These and other objects and advantages of the present invention will become readily apparent upon consideration of the following detailed description and attached drawing, wherein:

FIG. 4 is a schematic diagram of an alternate embodiment of the circuitry in accordance with the present invention; and FIGS. 5A and 5B are timing diagrams for the circuit illustrated in FIG. 4.

DETAILED DESCRIPTION OF THE PREFERRED EMBODIMENT

Figure 1:
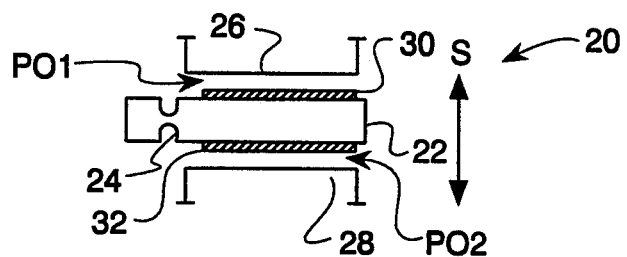
FIG. 1 is a simplified schematic representation of an accelerometer with capacitive elements suitable for use with the present invention.

The circuit in accordance with the present invention is particularly suited to be used with an accelerometer of the type illustrated in FIG. 1. In particular, the accelerometer, generally identified with the reference numeral 20, includes a proof mass 22, suspended by a flexure 24, which enables the proof mass 22 to deflect either upwardly or downwardly in response to an acceleration along a sensitive axis (as indicated by the arrow). A pair of excitation rings 26 and 28 is disposed on opposing sides of the proof mass 22. Pick-off capacitive plates 30 and 32 are rigidly disposed on opposing sides of the proof mass 22. The upper pick-off capacitive plate 30, in combination with the excitation ring 26 forms a first capacitive element P01. The lower pick-off capacitive plate 32 in combination with the lower excitation ring 28 forms a second capacitive element P02.

As shown in FIG. 1, the proof mass 22 is in an at rest or null position. In this position, the distance between the upper pick-off capacitive plate 30 and the upper excitation ring 26 and the distance between the lower pick-off capacitive plate 32 and the lower excitation ring 28 are equal. Since capacitance is a function of the distance between the plates, the capacitive values of the capacitive elements P01 and P02 are equal during this condition.

In response to an acceleration along the sensitive axis S, the proof mass 22 moves toward one of the excitation rings 26 or 28 which, in turn, changes the respective distances between the pick-off capacitor plates 30 and 32 and the excitation rings 26 and 28. This change in the distances results in a change of capacitance of the capacitive elements P01 and P02. In order to provide a relatively accurate output signal of the accelerometer 20, the circuit in accordance with the present invention provides relatively accurate measurement of such a capacitance change.

Figure 2:
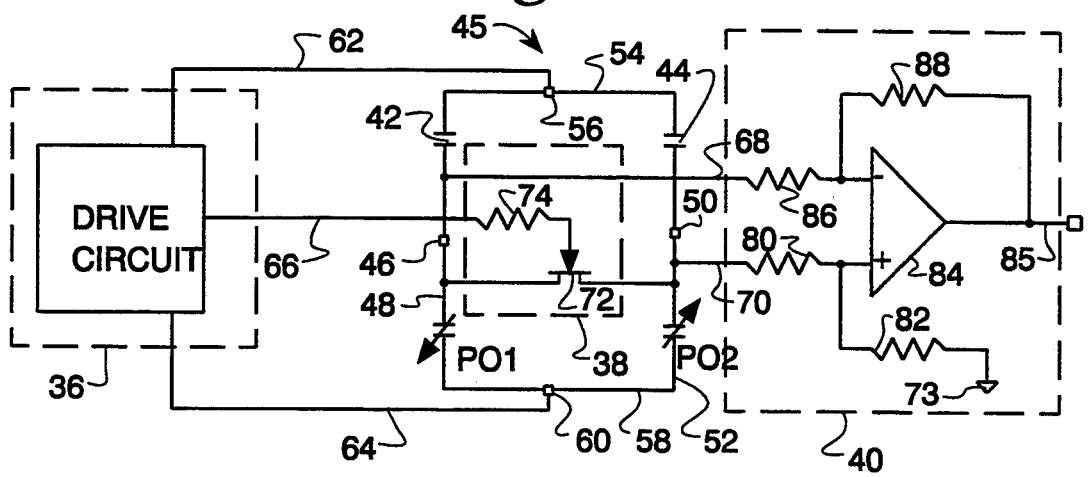
FIG. 2 is a schematic diagram of the circuitry in accordance with the present invention.

A first embodiment of the circuit in accordance with the present invention, generally identified with the reference numeral 34, is illustrated in FIG. 2. The circuit 34 includes a drive circuit 36, which may be an oscillator, a switching circuit 38, a detector circuit 40 and a pair of bridge capacitors 42 and 44.

The capacitive elements P01 and P02 are connected in a bridge circuit 45 with the bridge capacitors 42 and 44. In particular, the bridge capacitor 42 is serially connected to the capacitive element P01 defining a first common node 46 therebetween and forming a first leg 48 of the bridge 45. The second capacitive element P02 is serially connected to the bridge capacitor 44 defining a second common node 50 therebetween and forming a second leg 52 of the bridge. A third leg 54 of the bridge 45 is formed by connecting one side of the bridge capacitors 42 and 44 together defining a node 56 therebetween. Similarly, a fourth leg 58 of the bridge 45 is formed by connecting one side of the capacitive elements P01 and P02 together defining a common node 60 therebetween.

The bridge 45 is connected to the drive circuit 36 and the detector 40. In particular, as shown in FIG. 2, the drive circuit 36 provides drive signals along lines 62 and 64 to the nodes 56 and 60, respectively, of the bridge 45 as well as a gate signal along line 66 to the switching circuit 38. The common nodes 46 and 50 are connected to the detector circuit 40 along lines 68 and 70.

The circuit 34 provides distinct advantages over the circuit described and illustrated in U.S. Pat. No. 4,634,965 which results in relatively more accurate measurement of the capacitance values of the capacitive elements P01 and P02. More particularly, the switching circuit illustrated in U.S. Pat. No. 4,634,965 includes a pair of JFETs that are used to connect the common nodes between the bridge capacitors and the capacitive elements to a reference voltage. However, since each one of the common nodes is connected to the reference voltage by a different JFET, the common nodes are subject to unequal leakage currents and unequal junction capacitances which contribute error in the output signal of the detector. In order to reduce errors resulting from such unequal leakage currents and unequal junction capacitances, the switching circuit 38 in accordance with the present invention is implemented as a single junction field effect transistor (JFET) 72. The JFET 72 has two modes of operation. In particular, the source and drain terminals of the JFET 72 are used to connect the common nodes 46 and 50 together and to a reference voltage provided by the detector circuit 40 along line 70 in a first mode of operation when the JFET 72 is ON. In a second mode of operation, the JFET 72 is OFF in order to provide isolation between the common nodes 46 and 50 to enable differences in the voltages at the common nodes 46 and 50 to be measured by the detector circuit 40. The control for the JFET 72 is provided by the drive circuit 36, connected to the gate terminal of the JFET 72 by way of an input resistor 74. Since a single JFET is used, equal leakage currents and equal junction capacitances are contributed to the common nodes 46 and 50. Since these leakage currents and junction capacitances are equal, they are canceled out by the detector circuit 40.

The operation of the circuit illustrated in FIG. 2 is best illustrated with reference to the timing diagrams illustrated in FIGS. 3A–3C. The timing diagrams illustrated in FIGS. 3A and 3C refer to periodic output voltage pulses 76 having a duration $T_2$, applied by the drive circuit 36 to the nodes 56 and 60 along lines 62 and 64, respectively, during a second mode of operation of the JFET 72. The timing diagram illustrated in FIG. 3B illustrates periodic control pulses 78 having a pulse width $T_1$, applied to the gate of the JFET 72 along line 66 via the resistor 74.

In a first mode of operation, the JFET 72 is switched ON by the control pulse 78 by virtue of the zero potential applied to its gate terminal. During this mode of operation, the common nodes 46 and 50 are connected together and, in turn, to a reference voltage 73 supplied by the detector circuit via the resistors 80 and 82. The JFET 72 is ON during the time period $T_1$, determined by the pulse width of the control pulse 78. The pulse width $T_1$ is selected to be long enough to enable the common nodes 46 and 50 to discharge to equal voltages which are influenced by the reference potential 73. After the common nodes 46 and 50 reach equal potential, the JFET 72 is turned OFF via the negative potential applied to its gate terminal during the time period $T_2$ defining the second mode of operation of the switching circuit 38. During this time period $T_2$, the common nodes 46 and 50 are isolated from one another, while the capacitors 42, 44, P01 and P02 are charged by the voltage pulses 76 applied to the nodes 56 and 60 by the drive circuit 36 along lines 62 and 64. The voltage magnitude of the drive pulses 76 is distributed across the capacitors 42, 44, P01 and P02 as a function of the current value of their capacitance. Since the voltage across each leg 48, 52 of the bridge 45 is equal, and since the values of the bridge capacitors 42 and 44 are equal, the voltage difference between the common nodes 46 and 50 will be representative of the difference in capacitance of the capacitive elements P01 and P02. This voltage difference is detected by the detector circuit 40 and reflected at the detector output line 85. After the time period $T_2$, the cycle repeats and the JFET 72 is switched ON and OFF again by the pulses 78.

Figure 3A:
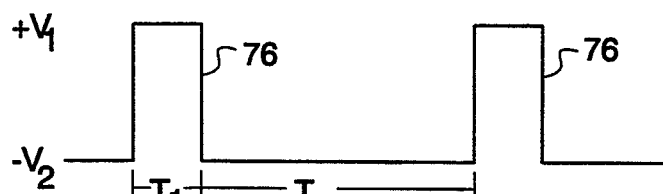
FIGS. 3A, 3B and 3C are timing diagrams for the circuit illustrated in FIG. 2.
Figure 3B:
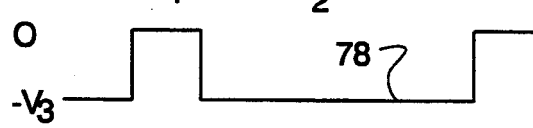
Figure 3C:
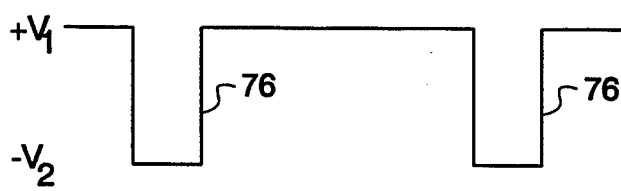

The drive circuit 36 may be formed from any conventional circuitry that provides periodic output pulses as generally illustrated in FIGS. 3A–3C. For example, the drive circuit 36 may be formed from a conventional oscillator circuit, such as an astable multivibrator as illustrated and described in detail in U.S. Pat. No. 4,634,965, herein incorporated by reference.

A preferred embodiment of the present invention, which may simplify the drive circuit configuration, uses 0 volts as the value of $+V_1$ and $-10$ volts as the value of $-V_2$ and $-V_3$. In addition, the pulse transitions of FIG. 3B precede the pulse transitions in FIGS. 3A and 3C by a brief interval.

The detector circuit 40 may be configured as a difference amplifier that includes an operational amplifier 84, a gain resistor 86, a negative feedback resistor 88 as well as a pair of input resistors 80 and 82. The operational amplifier 84 is configured with negative feedback having a gain as defined by the ratio of the resistor 88 to the resistor 86, connected to the inverting input of the amplifier 84. The input resistors 80 and 82 form a voltage divider network with respect to the reference voltage 73 and are applied to the non-inverting terminal of the operational amplifier 84 to adjust the magnitude of the output signal on line 85.

An alternate embodiment of the invention is illustrated in FIG. 4. This embodiment includes a drive circuit 88, a switching circuit 90, a detector circuit 92 and a pair of bridge capacitors 94 and 96. The switching circuit 90 includes a single JFET 98 as well as an input resistor 100. The detector circuit 92 includes an operational amplifier 102, input resistors 104 and 106, a feedback resistor 108 and a gain resistor 110. The capacitive elements P01 and P02, together with the bridge capacitors 94 and 96 are connected in a bridge circuit defining common nodes 112 and 114 between the bridge capacitors 94, 96 and the first and second capacitive elements P01, P02. Similar to the embodiment illustrated in FIG. 2, the JFET 92 is connected between the nodes 112 and 114 to connect the nodes 112 and 114 together and, in turn, to a reference voltage 116, supplied by the detector circuit 92 in a first mode of operation and which isolates the common nodes 112 and 114 in a second mode of operation.

The embodiment illustrated in FIG. 4 is similar to FIG. 2 except only one leg 118 of the bridge is driven by the drive circuit 88 while the other leg 120 of the bridge is connected to the reference potential 116. More particularly, in this embodiment, drive pulses 122 having a pulse width $T_2$ are applied to the leg 118 of the bridge circuit via line 126. Control pulses 124 having a pulse width $T_1$ are applied to the gate of the JFET 98 along line 128 via the input resistor 100.

The operation of the embodiment illustrated in FIG. 4 is similar to that of the embodiment illustrated in FIG. 2 with the exception of the charging voltage applied to the bridge circuit. In particular, in FIG. 2, if complementary pulses having a magnitude of 2 V are simultaneously applied to the legs 54 and 58 of the bridge, a voltage pulse equivalent to 4 V is distributed across the legs 48 and 52 of the bridge circuit. In the embodiment illustrated in FIG. 4, only one leg 118 of the bridge circuit is driven by the drive circuit 88 with a voltage pulse equal to $V_1$. The other leg 120 of the bridge circuit is connected to circuit common 116. In all other respects, the circuit illustrated in FIG. 4 operates in a similar manner as the circuit illustrated in FIG. 2.

In both circuits illustrated in FIGS. 2 and 4, errors in the output signal of the detector circuit 40 and 92 resulting from unequal transistor leakage currents and unequal junction capacitances are virtually eliminated by the switching circuits 38, 90 which utilizes a single JFET 72, 98 which contributes equal leakage currents and equal junction capacitances to the respective nodes 46, 50 and 112, 114 which are canceled by the detectors 40 and 92. Thus, the circuits illustrated in FIGS. 2 and 4 provide a relatively more accurate measurement of the first and second capacitive elements P01, P02 than the circuitry described in U.S. Pat. No. 4,634,965. The use of a single JFET 72, 98 in the switching circuit 38, 99, respectively, additionally results in a reduced number of parts and, consequently, reduces the overall cost of the accelerometer 20.

The configuration of the circuits illustrated in FIGS. 2 and 4 provide additional benefits. In particular, as mentioned above, certain accelerometer configurations enable one or the other of the capacitive elements P01, P02 to become short circuited due to the possibility of one of the pick-off capacitance plates 30, 32 to physically contact one of the excitation rings 26, 28. During such a condition, one or the other of the capacitive elements P01, P02 is potentially shorted together, while the other capacitive element will be at its minimum capacitance value due to the fact that its pick-off capacitive plate is at a maximum distance relative to the excitation ring. With the switching circuit described in U.S. Pat. No. 4,634,965, such a condition can cause a reverse polarity of the detector if the time $T_2$ of the drive circuit is not short enough which, in turn, can perhaps cause servo latch-up and potentially render the accelerometer temporarily non-functional. Even if the duty cycle is adequate, the detector gain under such a condition with that circuit is much lower than for the unshorted condition resulting in a relatively slow recovery from the shorted condition. The circuit in accordance with the present invention illustrated in FIG. 2 resolves this problem since during a first mode of operation, the capacitive element P01 or P02 that is not shorted is referenced to the drive voltage through the channel of the JFET 72, creating a relatively large difference voltage in the bridge during the second mode of operation which, in effect, maintains a relatively high detector gain under the shorted condition resulting in a relatively quick recovery from that condition.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A circuit for measuring the difference in capacitance of first and second capacitive elements, comprising:

a first capacitor having a fixed capacitive value, said first capacitor adapted to be serially connected to the first capacitive element defining a first common node therebetween, said first capacitive element and said first capacitor together forming a first leg of a bridge;

a second capacitor having a fixed capacitive value, said second capacitor adapted to be serially connected to the second capacitive element defining a second common node therebetween, said second capacitive element and said capacitor forming a second leg of the bridge, said first leg and said second leg connected together at opposing ends forming third and fourth legs of the bridge;

switch means for connecting said first and second common nodes together in a first mode of operation and isolating said first and second common nodes in a second mode of operation, said switch means having a single transistor with gate, source and drain terminals, said source and drain terminals directly connected between said first and second common nodes;

means electrically coupled to said bridge for applying predetermined voltage pulses to said bridge in said second mode of operation;

means for switching ON said transistor in said first mode of operation and for switching OFF said transistor in said second mode of operation; and means for detecting the voltage difference between said first and second common nodes during said second mode of operation.

2. A circuit as recited in claim 1, wherein said detecting means includes means for providing a reference voltage.

3. A circuit as recited in claim 2, further including means for connecting said first and second common nodes to said reference voltage during a predetermined condition.

4. A circuit as recited in claim 3, wherein said predetermined condition is said first mode of operation.

5. A circuit as recited in claim 1, wherein said applying means includes means for applying said predetermined voltage to one or the other of said third or fourth legs of said bridge at one time.

6. A circuit as recited in claim 1, wherein said applying means includes means for applying said predetermined voltage to both said third leg and said fourth leg at one time.

7. A circuit as recited in claim 1, wherein said applying means includes means for applying substantially equal predetermined voltages across said third and fourth legs of said bridge at one time.

8. A circuit as recited in claim 1, wherein said applying means includes means for generating predetermined periodic voltage pulses having a predetermined magnitude and a predetermined pulse width.

9. A circuit as recited in claim 8, wherein said applying means includes means for generating complementary pulses of substantially equal but opposite magnitude.

10. A circuit as recited in claim 9, wherein said complementary pulses are generated at substantially the same time.

* * * * *